United States Patent
Wang et al.

(10) Patent No.: US 10,365,741 B2
(45) Date of Patent: Jul. 30, 2019

(54) TOUCH DISPLAY SCREEN TESTING METHOD AND TOUCH DISPLAY SCREEN TESTING DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Kuohai Wang, Beijing (CN); Liang Sun, Beijing (CN); Hongliang Xu, Beijing (CN); Liyong Guo, Beijing (CN); Libin Miao, Beijing (CN); Zhenning Fan, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/701,673

(22) Filed: Sep. 12, 2017

(65) Prior Publication Data
US 2018/0188864 A1 Jul. 5, 2018

(30) Foreign Application Priority Data
Jan. 3, 2017 (CN) .......................... 2017 1 0001678

(51) Int. Cl.
*G06F 3/041* (2006.01)
*G06F 11/22* (2006.01)
*G09G 3/20* (2006.01)
*G09G 3/00* (2006.01)

(52) U.S. Cl.
CPC ........ *G06F 3/0412* (2013.01); *G06F 11/2221* (2013.01); *G09G 3/006* (2013.01); *G09G 3/20* (2013.01); *G06F 3/0416* (2013.01); *G06F 2203/04103* (2013.01); *G09G 2300/0408* (2013.01)

(58) Field of Classification Search
CPC .. G06F 3/0412; G06F 3/0416; G06F 11/2221; G06F 2203/04103; G09G 3/006; G09G 3/20
See application file for complete search history.

(56) References Cited

U.S. PATENT DOCUMENTS

| | | | | |
|---|---|---|---|---|
| 8,248,356 | B2* | 8/2012 | Chen | G09G 3/006 345/100 |
| 9,983,450 | B2* | 5/2018 | Yang | G02F 1/1368 |
| 2004/0232939 | A1* | 11/2004 | Toro-Lira | G09G 3/006 324/760.02 |
| 2006/0192752 | A1* | 8/2006 | Ando | G09G 3/006 345/156 |
| 2007/0132673 | A1* | 6/2007 | Jinno | G09G 3/006 345/76 |

(Continued)

*Primary Examiner* — Tom V Sheng
(74) *Attorney, Agent, or Firm* — Brooks Kushman P.C.

(57) ABSTRACT

A touch display screen testing method and a touch display screen testing device are provided. The method includes: applying a direct current signal to a gate driving circuit of the touch display screen to turn on gate electrodes of the touch display screen simultaneously, to detect a display defect of the touch display screen, in a first testing stage of an electric performance testing process at a Cell stage of a touch display screen.

6 Claims, 4 Drawing Sheets

---

| applying direct current signals to the gate driving circuit of the touch display screen to turn on all the gate electrodes of the touch display screen simultaneously, to detect a display defect of the touch display screen, in a first testing stage of the complete testing period | S401 |

↓

| applying time sequence alternate current signals to the gate driving circuit of the touch display screen, to detect a GOA defect of the touch display screen, in a second testing stage of the complete testing period | S402 |

(56) References Cited

U.S. PATENT DOCUMENTS

| | | | | |
|---|---|---|---|---|
| 2008/0315890 A1* | 12/2008 | Kasai | .................... | G09G 3/006 |
| | | | | 324/523 |
| 2013/0088679 A1* | 4/2013 | Lu | ......................... | G09G 3/006 |
| | | | | 349/139 |
| 2013/0155033 A1* | 6/2013 | Jin | ...................... | G09G 3/3266 |
| | | | | 345/204 |
| 2016/0104400 A1* | 4/2016 | Tsou | ..................... | G09G 3/006 |
| | | | | 345/92 |
| 2016/0139700 A1* | 5/2016 | Wang | .................... | G06F 3/044 |
| | | | | 345/174 |
| 2016/0148587 A1* | 5/2016 | Li | ......................... | G09G 3/006 |
| | | | | 345/212 |
| 2016/0180817 A1* | 6/2016 | Cho | ........................ | G09G 3/20 |
| | | | | 345/213 |
| 2018/0158741 A1* | 6/2018 | Kim | ....................... | H01L 22/12 |

* cited by examiner

TOUCH DISPLAY SCREEN TESTING METHOD AND TOUCH DISPLAY SCREEN TESTING DEVICE

CROSS-REFERENCE TO RELATED APPLICATION

This application claims priority to Chinese Patent Application No. 201710001678.5 filed on Jan. 3, 2017, which is incorporated herein by reference in its entirety.

TECHNICAL FIELD

The present disclosure relates to the field of liquid crystal touch screen, and in particular to a touch display screen testing method and a touch display screen testing device.

BACKGROUND

A thin film transistor liquid crystal display (TFT-LCD) is a photoelectron product, which applies liquid crystals as a medium and a thin film transistor as a control component and adopts a large-scale semiconductor integrated circuit technology and a flat plate light source technology. Along with a development of a touch panel function of a portable product, it becomes popular to integrate the function of the touch panel with a liquid crystal panel. The panel may become thinner and lighter when the external touch panel components are integrated with the liquid crystal panel.

In order to guarantee a product quality, it is required to perform a performance test during the manufacturing process of the product. It is able to screen out unqualified display screens in the case that the performance test is performed during the Cell process following the Array process of the liquid crystal display screen, to prevent the unqualified display screens from being used in the subsequent Module process to waster raw materials of IC and so on.

SUMMARY

In view of this, the present disclosure provides a touch display screen testing method and a touch display screen testing device.

A touch display screen testing method is provided in at least one embodiment of the present disclosure, including: applying a direct current signal to a gate driving circuit of the touch display screen to turn on gate electrodes of the touch display screen simultaneously, to detect a display defect of the touch display screen, in a first testing stage of an electric performance testing process.

Optionally, the method further includes: applying a time sequence alternate current signal to the gate driving circuit of the touch display screen, to detect a Gate Driver on Array (GOA) defect of the touch display screen, in a second testing stage of the electric performance testing process.

Optionally, the applying the direct current signal to the gate driving circuit of the touch display screen includes: applying a high-level direct current signal as an input signal of a reference level of a lowest level of the gate driving circuit of the touch display screen.

Optionally, the applying the direct current signal to the gate driving circuit of the touch display screen further includes: applying the high-level direct current signal as input signals besides the reference level of the lowest level of the gate driving circuit of the touch display screen.

Optionally, the method further includes: controlling the touch display screen to display images of different colors in the first stage of the electric performance testing process.

Optionally, the method further includes: controlling the touch display screen to display images of different colors in the second stage of the electric performance testing process.

A touch display screen testing device is further provided in at least one embodiment of the present disclosure, including a testing control unit configured to output a direct current output instruction in a first testing stage of an electric performance testing process and a direct current signal generation unit configured to apply, in response to the direct current output instruction, a direct current signal to the gate driving circuit of the touch display screen to turn on gate electrodes of the touch display screen simultaneously.

Optionally, the testing control unit is further configured to output an alternate current output instruction in a second testing stage of the electric performance testing process, and the device further includes an alternate current signal generation unit configured to apply a time sequence alternate current signal to the gate driving circuit of the touch display screen in response to the alternate output instruction.

Optionally, the direct current signal generation unit is further configured to apply, in response to the direct current output instruction, a high-level direct current signal as an input signal of a reference level of a lowest level of the gate driving circuit of the touch display screen to turn on the gate electrodes of the touch display screen simultaneously.

Optionally, the direct current signal generation unit is further configured to apply, in response to the direct current output instruction, the high-level direct current signal as input signals besides the reference level of the lowest level of the gate driving circuit of the touch display screen.

Optionally, the testing control unit is further configured to control the touch display screen to display images of different colors in the case that the direct current signal generation unit applies the direct current signal to the gate driving circuit of the touch display screen.

Optionally, the testing control unit is further configured to control the touch display screen to display images of different colors in the case that the alternate current signal generation unit applies the time sequence alternate current signal to the gate driving circuit of the touch display screen.

DETAILED DESCRIPTION

In order to make the objects, the technical solutions and the advantages of the present disclosure more apparent, the present disclosure will be described hereinafter in details in conjunction with the drawings and embodiments.

The present disclosure will be described hereinafter in conjunction with the drawings and embodiments. The following embodiments are for illustrative purposes only, but shall not be used to limit the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

Figure 1:
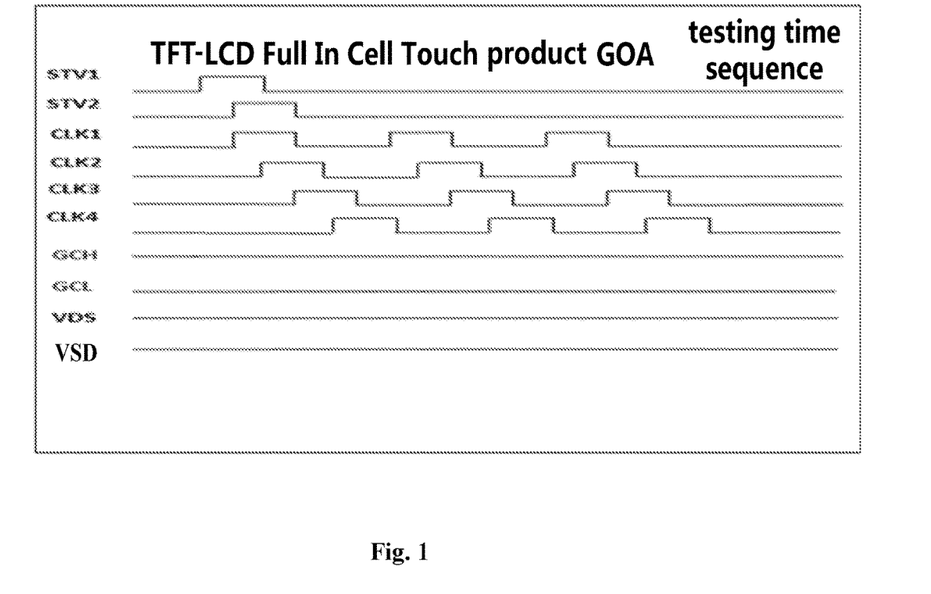
FIG. 1 is a schematic view of a time sequence of alternate current signals during an electric performance testing process at a Cell stage of a touch display screen in the related art.

At present, an electric performance testing (ET) process in the Cell stage is mainly to connect pins of a Gate driver on Array (GOA) of a formed touch display screen or a liquid crystal cell (i.e., a gate driving circuit) to a digital signal source, and the digital signal source outputs testing time sequence signals to perform the test. As shown in FIG. 1, the digital signal source applies time sequence alternate current signals to pins of GOA of the liquid crystal cell such as STV1 and STV2. The observer observes the display situation and find out the unqualified products.

Figure 2:
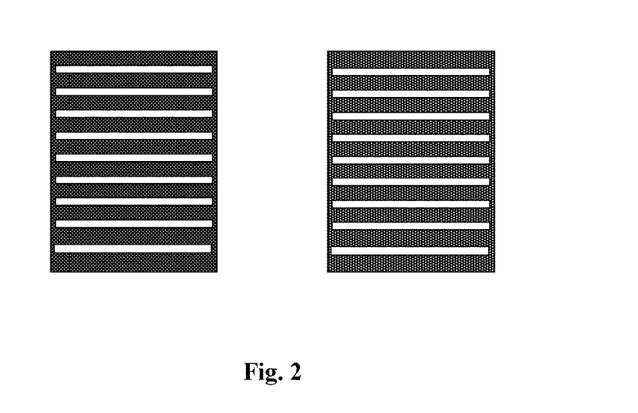
FIG. 2 shows transverse stripes displayed on a display screen when applying time sequence alternate signals during the electric performance testing process at the Cell stage of the touch display screen in the related art.

However, in an actual application, some unqualified products may not be detected based on the testing method in the related art. The unqualified products may be used in the Module stage and detected until the product is manufactured, and thus the raw materials are wasted. By analyzing the testing method in the related art, it is found that a driving capability of a digital signal passed through the switch is weakened during the electric performance testing process at the Cell stage of the touch display screen due to the design of the FIC touch product, so transverse stripes, which are commonly called as Touch lines, may appear on the display screen, as shown in FIG. 2. Due to the Touch lines, detection personnel cannot detect spots, lines and stains, and thus some unqualified products may not be detected.

Figure 3A:
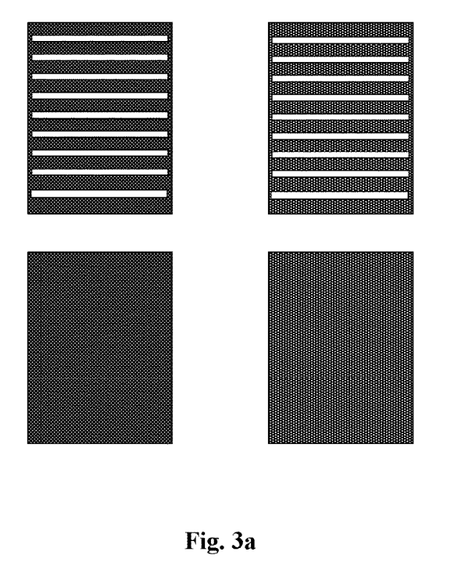
FIG. 3a shows transverse stripes displayed on a display screen when applying time sequence alternate signals to a gate driving circuit of a touch display screen and a display screen without transverse stripes when applying direct current signals to the gate driving circuit of the touch display screen.

In an actual application, it is found that, during the electric performance testing process at the Cell stage of the touch display screen, the current may be high in the case that the digital signal source applies direct current signals in one testing stage to the gate driving circuit of the touch display screen to turn on all the gate electrodes of the touch display screen, and the driving capability of the digital signals passed through the switch may not be weakened, and thus the touch display screen may display a uniform image and the Touch lines may disappear. FIG. 3a shows transverse stripes displayed on a display screen when applying time sequence alternate signals to a gate driving circuit of a touch display screen and a display screen without transverse stripes when applying direct current signals to the gate driving circuit of the touch display screen.

Because the Touch lines disappear, the detection personnel may not be interfered by the Touch lines, so the detection personnel may detect the ordinary display defect of the display screen such as spots, lines, stains and Mura, and thereby increasing the ratio of detecting the touch display screen having the defects. Therefore, the unqualified products may not be used in the Module stage and detected until the product is manufactured, and thus the raw materials may not be wasted.

Therefore, according to the touch display screen testing method, during the electric performance testing process at the Cell stage of the touch display screen, direct current signals are applied in one testing stage to the gate driving circuit of the touch display screen to turn on all the gate electrodes of the touch display screen simultaneously, that is, all the pixels of the display screen may display images simultaneously, so as to detect the display defect of the touch display screen, therefore the detection personnel may detect the ordinary display defect of the display screen in a more complete manner and a ratio of detecting the defect may be increased.

In an actual application, in an optional manner, the direct current signals are applied in one testing stage to the gate driving circuit of the touch display screen during the electric performance testing process at the Cell stage of the touch display screen, so as to detect the display defect of the touch display screen such as an ordinary display defect, and alternate current signals are applied in the other testing stage to the gate driving circuit of the touch display screen during the electric performance testing process at the Cell stage of the touch display screen, so as to detect a GOA defect of the touch display screen such as a defect of a gate electrode or a gate driving circuit. After the above testing stages, the touch display screen having various display defects may be screened out, thereby increasing significantly the ratio of detecting the unqualified products and reducing the waste of the raw material.

Optionally, the touch display screen may be controlled to display images of different colors in the testing stage of applying the direct current signals to the gate driving circuit of the touch display screen. Due to the images of different colors, the detection personnel may detect various types of display defects more conveniently, thereby further increasing the ratio of detecting the unqualified products. Similarly, the touch display screen may be controlled to display images of different colors in the testing stage of applying the alternate current signals to the gate driving circuit of the touch display screen, and the detection personnel may detect various types of GOA defects more conveniently. For example, the detection personnel may detect conveniently bright spots or a touch defect in a black image and a bus driving defect in a gray image, thereby further increasing the ratio of detecting the unqualified products.

Based on the above principle, the embodiments of the present disclosure will be described hereinafter in details in conjunction with the drawings.

Figure 3B:
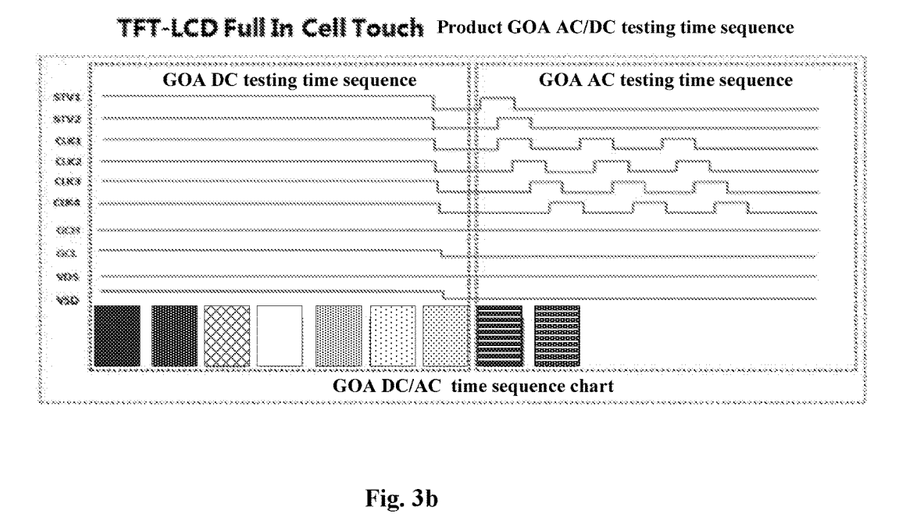
FIG. 3b is a waveform view of signals applied to pins of a gate driving circuit of a touch display screen by a digital signal source during an electric performance testing process at a Cell stage of a touch display screen in at least one embodiment of the present disclosure.
Figure 4:
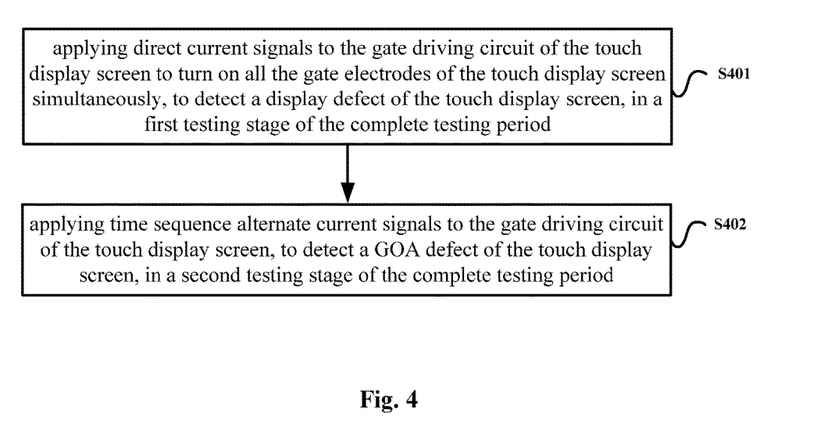
FIG. 4 is a flow chart of a testing method in a complete testing period during an electric performance testing process at a Cell stage of a touch display screen in at least one embodiment of the present disclosure.

According to the touch display screen testing method in at least one embodiment of the present disclosure, the electric performance testing process at the Cell stage of the touch display screen includes at least one complete testing period. During the complete testing period, the digital signal source applies signals to the pins of the gate driving circuit of the touch display screen. The waveforms of the signals are shown in FIG. 3. FIG. 4 is a flow chart of the testing method in the complete testing period. The testing method includes:

Step 401: applying direct current signals to the gate driving circuit of the touch display screen to turn on all the gate electrodes of the touch display screen simultaneously, to detect a display defect of the touch display screen, in a first testing stage of the complete testing period.

In Step 401, in the first testing stage of the complete testing period, the digital signal source is controlled to apply the direct current signals to the gate driving circuit of the touch display screen to turn on all the gate electrodes of the touch display screen simultaneously.

To be specific, the digital signal source is controlled to apply a high-level direct current signal as an input signal of a reference level of a lowest level of the gate driving circuit of the touch display screen, to turn on all the gate electrodes of the touch display screen simultaneously. For example, levels of a GCL and a VSD pins of the gate driving circuit may set to be a high level, so as to turn on all the gate electrodes of the touch display screen simultaneously, or a level of a VGL pin of certain types of gate driving circuit may be set as a high level, so as to turn on all the gate electrodes of the touch display screen simultaneously.

Optionally, the digital signal source is further controlled to apply high-level direct current signals as other input signals of the gate driving circuit of the touch display screen. That is, the high-level direct current signals may be applied as input signals besides the reference level of the lowest level of the gate driving circuit of the touch display screen, such arrangement is simple for the digital signal source, and the display image may be more uniform and the Touch lines may disappear completely.

Optionally, the touch display screen may be controlled to display images of different colors in the first testing stage of applying the direct current signals to the gate driving circuit of the touch display screen. For example, as shown in FIG. 3b, the touch display screen may be controlled to display images of different colors in the first testing stage of applying the direct current signals to the gate driving circuit of the touch display screen, where the images of different colors include a black image, a gray image, a light gray image, a white image, a red image, a green image and a blue image. Due to the images of different colors, the detection personnel may detect different types of ordinary display defects. For example, foreign matters, Zara, Rubbing Mura may be detected in the black image, stains, Gap, white spots, black spots, bright spots may be detected in a dark gray or light gray image, and an abnormal display, Line may be detected in a white image or a red, green or blue image.

The way to control the touch display screen to display images of different colors is common for those skilled in the art, and the detailed description thereof is omitted herein.

Step 402: applying time sequence alternate current signals to the gate driving circuit of the touch display screen, to detect a GOA defect of the touch display screen, in a second testing stage of the complete testing period.

In the second testing stage of the complete testing period, the digital signal source may be controlled to apply time sequence alternate current signals to the gate driving circuit of the touch display screen. To be specific, the digital signal source may be controlled to apply time sequence alternate current signals (FIG. 1 shows the waveform of the signals) to the gate driving circuit of the touch display screen in a manner in a related art, so as to detect the GOA defect of the touch display screen. The way to control the touch display screen to apply time sequence alternate current signals to the gate driving circuit of the touch display screen is common for those skilled in the art, and the detailed description thereof is omitted herein.

Optionally, the touch display screen may be controlled to display images of different colors in the second testing stage of applying the alternate current time sequence signals to the gate driving circuit of the touch display screen. For example, the touch display screen may be controlled to display black and gray images in the second testing stage. Due to the images of different colors, the detection personnel may detect different types of GOA defects.

In at least one embodiment of the present disclosure, the direct current signals are applied to the gate driving circuit of the touch display screen in the first testing stage, and the alternate current time sequence signals are applied to the gate driving circuit of the touch display screen in the second testing stage, however, it should be appreciated by those skilled in the art, it is also available to apply the alternate current time sequence signals to the gate driving circuit of the touch display screen in the first testing stage and apply the direct current signals to the gate driving circuit of the touch display screen in the second testing stage, and those may also fall into the scope of the present disclosure.

According to the testing method in at least one embodiment of the present disclosure, the direct current signals are applied to the gate driving circuit of the touch display screen during the electric performance testing process at the Cell stage of the touch display screen, the image displayed by the touch display screen may be uniform and the Touch lines may disappear, thereby increasing the ratio of detecting the unqualified touch display screen.

Optionally, during the electric performance testing process at the Cell stage of the touch display screen, the complete testing period includes a testing stage of applying the direct current signals to the gate driving circuit of the touch display screen to detect the ordinary display defects of the screen and a testing stage of applying the alternate current time sequence signals to the gate driving circuit of the touch display screen to detect the GOA defects of the screen. Therefore, in a complete testing period, the touch display screen having the ordinary display defects and the GOA defects may be detected, thereby increasing significantly the ratio of detecting the unqualified products and reducing the waster of the raw material.

Optionally, the touch display screen may be controlled to display images of different colors in the testing stage of applying the direct current signals to the gate driving circuit of the touch display screen. Due to the images of different colors, the detection personnel may detect various types of ordinary display defects more conveniently, thereby further increasing the ratio of detecting the unqualified products.

Similarly, the touch display screen may be controlled to display images of different colors in the testing stage of applying the alternate current time sequence signals to the gate driving circuit of the touch display screen. Due to the images of different colors, the detection personnel may detect various types of GOA defects more conveniently, thereby further increasing the ratio of detecting the unqualified products.

Figure 5:
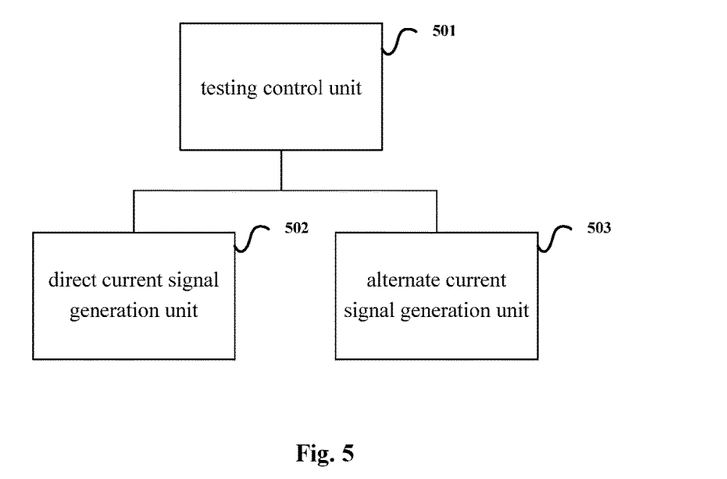
FIG. 5 is a schematic view of a touch display screen testing device in at least one embodiment of the present disclosure.

Based on the above method, a touch display screen testing device is further provided in at least one embodiment of the present disclosure, including a testing control unit 501 and a direct current signal generation unit 502.

The testing control unit 501 is configured to output a direct current output instruction in a first testing stage of an electric performance testing process at a Cell stage of a touch display screen.

The direct current signal generation unit 502 is configured to apply, in response to the direct current output instruction sent by the testing control unit 501, a direct current signal to the gate driving circuit of the touch display screen to turn on gate electrodes of the touch display screen simultaneously.

To be specific, the direct current signal generation unit 502 applies, in response to the direct current output instruction, a high-level direct current signal as an input signal of a reference level of the lowest level of the gate driving circuit of the touch display screen to turn on the gate electrodes of the touch display screen simultaneously.

Optionally, the direct current signal generation unit 502 may further apply, in response to the direct current output instruction, the high-level direct current signal as input signals besides the reference level of the lowest level of the gate driving circuit of the touch display screen.

Optionally, the touch display screen testing device may further include an alternate current signal generation unit 503.

The testing control unit 501 is further configured to output an alternate current output instruction in a second testing stage of the electric performance testing process at the Cell stage of the touch display screen.

The alternate current signal generation unit 503 is further configured to apply a time sequence alternate current signal to the gate driving circuit of the touch display screen in response to the alternate output instruction sent by the testing control unit 501.

Optionally, the testing control unit 501 is further configured to control the touch display screen to display images of different colors (e.g. a black image, a dark gray image, a light gray image, a white image, a red image, a blue image and a green image) in the case that the direct current signal generation unit 502 has applied the direct current signal to the gate driving circuit of the touch display screen.

The detection control unit 501 is further configured to control the touch display screen to display images of different colors in the case that the alternate current signal generation unit 503 has applied the time sequence alternate current signal to the GOA of the touch display screen.

According to the touch display screen testing method in at least one embodiment of the present disclosure, the electric performance testing process at the Cell stage of the touch display screen includes at least one complete testing period. The complete testing period includes a plurality of testing sub-periods, and the touch display screen may display images of different colors in respective testing sub-periods of one complete testing period.

For example, the complete testing period includes seven testing sub-periods, and the touch display screen displays a black image, a dark gray image, a light gray image, a white image, a red image, a blue image and a green image in the seven testing sub-periods respectively.

Figure 6:
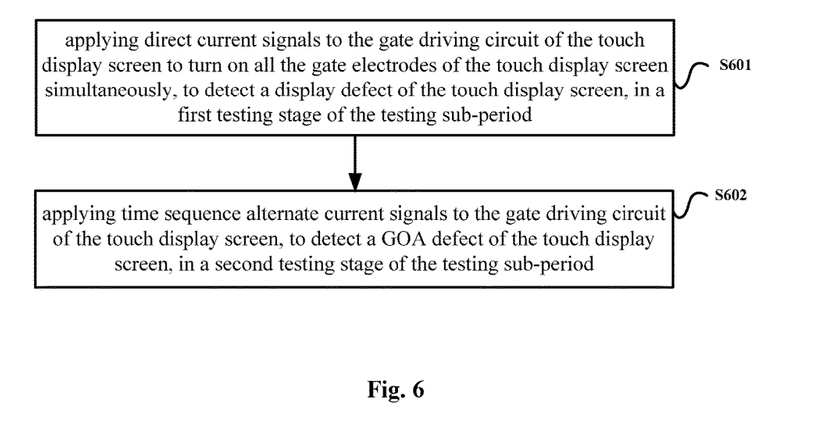
FIG. 6 is a flow chart of a testing method in a testing sub-period during an electric performance testing process at a Cell stage of a touch display screen in at least one embodiment of the present disclosure.

As shown in FIG. 6, a testing method in a testing sub-period includes the following steps.

Step 601: applying direct current signals to the gate driving circuit of the touch display screen to turn on all the gate electrodes of the touch display screen simultaneously, to detect a display defect of the touch display screen, in a first testing stage of the testing sub-period.

To be specific, in the first testing stage of the testing sub-period, the digital signal source is controlled to apply the direct current signals to the gate driving circuit of the touch display screen to turn on all the gate electrodes of the touch display screen simultaneously. For example, the digital signal source is controlled to apply a high-level direct current signal as an input signal of a reference level of a lowest level of the gate driving circuit of the touch display screen, to turn on all the gate electrodes of the touch display screen simultaneously.

Optionally, the digital signal source is further controlled to apply high-level direct current signals as other input signals of the gate driving circuit of the touch display screen. That is, the high-level direct current signals may be applied as input signals besides the reference level of the lowest level of the gate driving circuit of the touch display screen, such arrangement is simple for the digital signal source, and the display image may be more uniform and the Touch lines may disappear completely.

Step 602: applying time sequence alternate current signals to the gate driving circuit of the touch display screen, to detect a GOA defect of the touch display screen, in a second testing stage of the testing sub-period.

In the second testing stage of the testing sub-period, the digital signal source may be controlled to apply time sequence alternate current signals to the gate driving circuit of the touch display screen, so as to detect the GOA defect of the touch display screen.

In at least one embodiment of the present disclosure, the direct current signals are applied to the gate driving circuit of the touch display screen in the first testing stage of the testing sub-period, and the alternate current time sequence signals are applied to the gate driving circuit of the touch display screen in the second testing stage of the testing sub-period, however, it should be appreciated by those skilled in the art, it is also available to apply the alternate current time sequence signals to the gate driving circuit of the touch display screen in the first testing stage and apply the direct current signals to the gate driving circuit of the touch display screen in the second testing stage, and those may also fall into the scope of the present disclosure.

According to the testing method in at least one embodiment of the present disclosure, the direct current signals are applied to the gate driving circuit of the touch display screen during the electric performance testing process at the Cell stage of the touch display screen, the image displayed by the touch display screen may be uniform and the Touch lines may disappear, thereby increasing the ratio of detecting the unqualified touch display screen.

Optionally, during the electric performance testing process at the Cell stage of the touch display screen, the testing sub-period includes a testing stage of applying the direct current signals to the gate driving circuit of the touch display screen to detect the ordinary display defects of the screen and a testing stage of applying the alternate current time sequence signals to the gate driving circuit of the touch display screen to detect the GOA defects of the screen. Therefore, in a testing sub-period, the touch display screen having the ordinary display defects and the GOA defects may be detected, thereby increasing significantly the ratio of detecting the unqualified products and reducing the waste of the raw material.

Optionally, the complete testing period of the electric performance testing process at the Cell stage of the touch display screen includes a plurality of testing sub-periods, and the touch display screen may display images of different colors in respective testing sub-periods of one complete testing period. Due to the images of different colors, the detection personnel may detect various types of ordinary display defects and GOA defects more conveniently, thereby further increasing the ratio of detecting the unqualified products.

Figure 7:
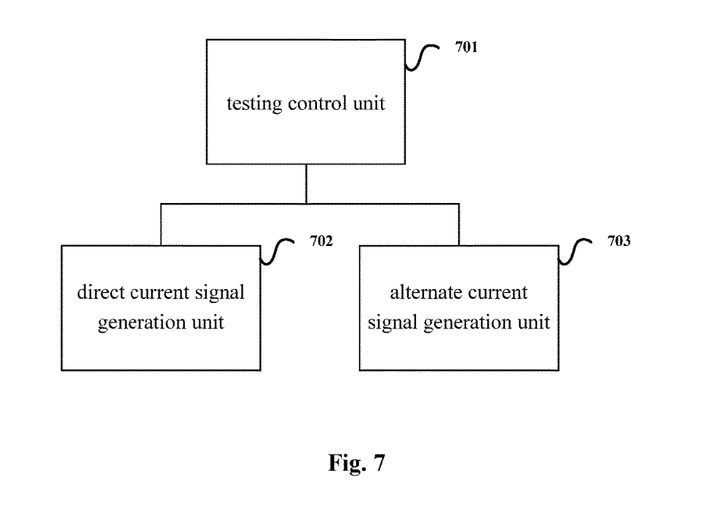
FIG. 7 is a schematic view of a touch display screen testing device in at least one embodiment of the present disclosure.

As shown in FIG. 7, a touch display screen testing device is further provided in at least one embodiment of the present disclosure, including a testing control unit 701 and a direct current signal generation unit 702.

The testing control unit 701 is configured to output a direct current output instruction in a first testing stage of an electric performance testing process at a Cell stage of a touch display screen.

The direct current signal generation unit 702 is configured to apply, in response to the direct current output instruction sent by the testing control unit 701, a direct current signal to the gate driving circuit of the touch display screen to turn on gate electrodes of the touch display screen simultaneously.

To be specific, the direct current signal generation unit 702 applies, in response to the direct current output instruction, a high-level direct current signal as an input signal of a reference level of the lowest level of the gate driving circuit of the touch display screen to turn on the gate electrodes of the touch display screen simultaneously.

Optionally, the direct current signal generation unit 702 may further apply, in response to the direct current output instruction, the high-level direct current signal as input signals besides the reference level of the lowest level of the gate driving circuit of the touch display screen.

Optionally, the touch display screen testing device may further include an alternate current signal generation unit 703.

The testing control unit 701 is further configured to output an alternate current output instruction in a second testing stage of the electric performance testing process at the Cell stage of the touch display screen.

The alternate current signal generation unit 703 is further configured to apply a time sequence alternate current signal to the gate driving circuit of the touch display screen in response to the alternate output instruction sent by the testing control unit 701.

Optionally, the testing control unit 701 is configured to output the direct current output instruction in the first testing stage of the testing sub-period, and output the alternate current output instruction in the second testing stage of the testing sub-period. In addition, the testing control unit 701 is further configured to control the touch display screen to display images of different colors in respective testing sub-periods of one complete testing period. The electric performance testing process at the Cell stage of the touch display screen includes a plurality of testing sub-periods. To be specific, the electric performance testing process at the Cell stage of the touch display screen includes at least one complete testing period, and the complete testing period includes a plurality of testing sub-periods.

According to at least one embodiment of the present disclosure, the direct current signals are applied to the gate driving circuit of the touch display screen during the electric performance testing process at the Cell stage of the touch display screen, the image displayed by the touch display screen may be uniform and the Touch lines may disappear. Because the Touch lines disappear, the detection personnel may not be interfered by the Touch lines, so the detection personnel may detect the ordinary display defect of the display screen such as spots, lines, stains and Mura, and thereby increasing the ratio of detecting the touch display screen having the defects. Therefore, the unqualified products may not be used in the Module stage and detected until the product is manufactured, and thus the raw materials may not be wasted.

Optionally, the direct current signals are applied in one testing stage to the gate driving circuit of the touch display screen during the electric performance testing process at the Cell stage of the touch display screen, so as to detect the display defect of the touch display screen such as an ordinary display defect, and the alternate current signals are applied in the other testing stage to the gate driving circuit of the touch display screen during the electric performance testing process at the Cell stage of the touch display screen, so as to detect a GOA defect of the touch display screen. After the above testing stages, the touch display screen having various display defects and GOA defects may be screened out, thereby increasing significantly the ratio of detecting the unqualified products and reducing the waste of the raw material.

Optionally, the touch display screen may be controlled to display images of different colors in the testing stage of applying the direct current signals to the gate driving circuit of the touch display screen. Due to the images of different colors, the detection personnel may detect various types of ordinary display defects more conveniently, thereby further increasing the ratio of detecting the unqualified products.

Similarly, the touch display screen may be controlled to display images of different colors in the testing stage of applying the alternate current time sequence signals to the gate driving circuit of the touch display screen. Due to the images of different colors, the detection personnel may detect various types of GOA defects more conveniently, thereby further increasing the ratio of detecting the unqualified products.

It should be appreciated that, the present disclosure may be provided as a method, a system or a computer program product, so the present disclosure may be in the form of full hardware embodiments, full software embodiments, or combinations thereof. In addition, the present disclosure may be in the form of a computer program product implemented on one or more computer-readable storage mediums (including but not limited to disk memory, CD-ROM and optical memory) including computer-readable program codes.

The present disclosure has been described with reference to the flow charts and/or block diagrams of the method, device (system) and computer program product according to the embodiments of the present disclosure. It should be understood that computer program instructions may be used to implement each of the work flows and/or blocks in the flow charts and/or the block diagrams, and the combination of the work flows and/or blocks in the flow charts and/or the block diagrams. These computer program instructions may be provided to a processor of a common computer, a dedicate computer, an embedded processor or any other programmable data processing devices to create a machine, so that instructions executable by the processor of the computer or the other programmable data processing devices may create a device to achieve the functions assigned in one or more work flows in the flow chart and/or one or more blocks in the block diagram.

These computer program instructions may also be stored in a computer readable storage that may guide the computer or the other programmable data process devices to function in a certain way, so that the instructions stored in the computer readable storage may create a product including an instruction unit which achieves the functions assigned in one or more flows in the flow chart and/or one or more blocks in the block diagram.

These computer program instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function assigned in one or more flows in the flow chart and/or one or more blocks in the block diagram.

The above are merely the preferred embodiments of the present disclosure. A person skilled in the art may make further modifications and improvements without departing from the principle of the present disclosure, and these modifications and improvements shall also fall within the scope of the present disclosure.

What is claimed is:

1. A touch display screen testing method, comprising: applying a direct current signal to a gate driving circuit of a touch display screen to turn on gate electrodes of the touch display screen simultaneously, to control all pixel units to enable the touch display screen to display images of different colors and detect a display defect of the touch display screen through observing the images of different colors, in a first testing stage of an electric performance testing process.

2. The method according to claim 1, wherein the applying the direct current signal to the gate driving circuit of the touch display screen comprises: applying a high-level direct current signal as an input signal of a reference level of a lowest level of the gate driving circuit of the touch display screen.

3. The method according to claim 2, wherein the applying the direct current signal to the gate driving circuit of the touch display screen further comprises: applying the high-level direct current signal as input signals besides the reference level of the lowest level of the gate driving circuit of the touch display screen.

4. A touch display screen testing device, comprising a testing control unit configured to output a direct current output instruction in a first testing stage of an electric performance testing process and a direct current signal generation unit configured to apply, in response to the direct current output instruction, a direct current signal to a gate driving circuit of a touch display screen to turn on gate electrodes of the touch display screen simultaneously, to control all pixel units to enable the touch display screen to display images of different colors and detect a display defect of the touch display screen through observing the images of different colors in the first testing stage of an electric performance testing process.

5. The touch display screen testing device according to claim 4, wherein the direct current signal generation unit is further configured to apply, in response to the direct current output instruction, a high-level direct current signal as an input signal of a reference level of a lowest level of the gate driving circuit of the touch display screen to turn on the gate electrodes of the touch display screen simultaneously.

6. The touch display screen testing device according to claim 5, wherein the testing control unit is further configured to apply, in response to the direct current output instruction, the high-level direct current signal as input signals besides the reference level of the lowest level of the gate driving circuit of the touch display screen.

* * * * *